United States Patent

Endo

[11] Patent Number: 5,982,137
[45] Date of Patent: Nov. 9, 1999

[54] CONTROLLER FOR ELECTRIC POWER STEERING SYSTEM

[75] Inventor: Shuji Endo, Maebashi, Japan

[73] Assignee: NSK Ltd., Tokyo, Japan

[21] Appl. No.: 09/026,609

[22] Filed: Feb. 20, 1998

[30] Foreign Application Priority Data

Feb. 25, 1997 [JP] Japan ..................................... 9-040218

[51] Int. Cl.$^6$ .................................................... H02P 3/18
[52] U.S. Cl. ........................................... 318/812; 180/412
[58] Field of Search .................................... 318/798, 799, 318/802, 805, 806, 808, 812, 432; 180/412, 443, 290

[56] References Cited

U.S. PATENT DOCUMENTS

| | | | |
|---|---|---|---|
| 4,582,155 | 4/1986 | Ohe | 318/491 |
| 4,624,335 | 11/1986 | Shiraishi et al. | 180/142 |
| 4,653,601 | 3/1987 | Nakamura et al. | 180/79 |
| 4,756,375 | 7/1988 | Ishikura et al. | 180/79.1 |
| 5,361,210 | 11/1994 | Fu | 364/424.05 |
| 5,521,475 | 5/1996 | Fu et al. | 318/459 |

FOREIGN PATENT DOCUMENTS 61-285171  12/1986  Japan ............................... B62D 5/04
7-81589     3/1995  Japan .

*Primary Examiner*—Robert E. Nappi
*Assistant Examiner*—Rina I. Duda
*Attorney, Agent, or Firm*—Sughrue, Mion, Zinn Macpeak & Seas, PLLC

[57] ABSTRACT

Controller for an electric power steering system, which is adapted to predict a drop in power supply voltage for a motor and to perform an idling-up operation when the drop in the power supply voltage is predicted. Namely, this controller for the electric power steering system is adapted to control the motor for giving a steering assist force to a steering mechanism according to a current control value calculated from a steering assist command value, which is computed according to steering torque generated in a steering shaft, and from a motor current value. Further, this controller is provided with a predicting unit for predicting an occurrence of the drop in power supply voltage to be applied to the motor. Moreover, an idling-up operation is performed when the drop in power supply voltage is predicted.

7 Claims, 11 Drawing Sheets

CONTROLLER FOR ELECTRIC POWER STEERING SYSTEM

BACKGROUND OF THE INVENTION

1. Field of the Invention

The present invention generally relates to a controller for an electric power steering system adapted to give a steering system of an automobile or a vehicle a steering assist force which is generated by a motor. More specifically, the present invention relates to a controller for an electric power steering system adapted to enhance the responsiveness thereof to an emergency steerage (or steering operation) by predicting an occurrence of a drop in power supply voltage and by performing an idling-up operation.

2. Description of the Related Art

Conventional motor-driven power steering system for performing the auxiliary load pressing of a steering unit by utilizing the turning (or rotating) force of a motor is adapted so that the auxiliary load pressing is performed on a steering shaft or a rack shaft by means of a transmitting mechanism, such as a gear or a belt, for transmitting the driving force of the motor through a reduction gear. Such a conventional motor-driven power steering system performs feedback control of the motor current so as to generate steering assist torque accurately.

The feedback control is to regulate a voltage applied or impressed to the motor in such a manner that the difference between a current control value and a motor current detection value decreases. Generally, the regulation of the voltage applied to the motor is performed by regulating a duty ratio to be used in PWM (Pulse Width Modulation) control operation.

Hereinafter, the common or ordinary configuration of such a motor-driven power steering system will be described by illustrating thereof in FIG. 1. A shaft 2 of a steering handle 1 is connected with tie-rods 6 respectively corresponding to wheels through a reduction gear 3, universal joints 4a and 4b and a pinion/rack mechanism 5. A torque sensor 10 for detecting the steering torque of the steering handle 1 is attached to the shaft 2. A motor 20 for assisting the steering force of the steering handle 1 is connected to the shaft 2 through a clutch 21 and the reduction gear 3. Electric power is supplied through a battery 14 and an ignition key 11 to a control unit 30 for controlling the power steering system. Then, the control unit 30 computes a steering assist command value I, which is obtained by performing an assist command, on the basis of steering torque T, which is detected by the torque sensor 10, and of a vehicle velocity or speed V, which is detected by a vehicle speed sensor 12. Further, on the basis of the computed steering assist command value I, the control unit 30 controls an electric current to be supplied to the motor 20. On/off control of the clutch 21 is controlled by the control unit 30 and is turned ON (namely, is engaged) under ordinary operating conditions. Moreover, when the control unit 30 judges that the power steering system is out of order, and when power from the battery 14 is turned OFF by the ignition key 11, the clutch 21 is turned OFF (namely, is disengaged).

The control unit 30 is constituted mainly by a CPU. FIG. 2 illustrates the common functions to be performed by executing programs in the CPU. For example, a block, in which a word "phase compensator 31" is written, does not represent a phase compensator serving as independent hardware. Instead, this block represents a phase compensation function to be performed by the CPU. Functions and operations of the control unit 30 will be described hereinbelow. First, in the phase compensator 31, a phase compensation is performed on the steering torque T, which is detected and inputted by the torque sensor 10, so as to enhance the stability of the steering system. Subsequently, the phase-compensated steering torque TA is inputted to a steering assist command value computing unit 32. Further, a vehicle speed V detected by the vehicle speed sensor 12 is inputted to the steering assist command value computing unit 32. Then, the steering assist command value computing unit 32 determines a steering assist command value I, which is a control target value of a current to be supplied to the motor 20, according to the steering torque TA and the vehicle speed V inputted thereto. Additionally, a memory 33 is attached to the steering assist command value computing unit 32. Further, the memory 33 stores the steering assist command value I corresponding to the steering torque therein by using the vehicle speed V as a parameter, and is used for computing the steering assist command value I by means of the steering assist command value computing unit 32. Moreover, the steering assist command value I is inputted to a subtracter 30A and is also inputted to a differential compensator 34 of the feed forward system, which is used for increasing a response speed. Deviation (I–i) obtained by the subtracter 30A is inputted to a proportional computation unit 35. Proportional output of the proportional computation unit 35 is inputted to an adder 30B and is also inputted to an integral compensator 36 for improving characteristics of the feedback system. Outputs of the differential compensator 34 and the integral compensator 36 are inputted to the adder 30B, and an addition of the outputs of the proportional computation unit 35 and the compensators 34 and 35 is performed therein. Signal representing a current control value E, which is a result of an addition performed in the adder 30B, is inputted to a motor driving circuit as a motor driving signal. Motor current value i for the motor 20 is detected by a motor current detecting circuit 38 and is further inputted and feedbacked to the subtracter 30A.

Example of the configuration of the motor driving circuit will be described hereinbelow by illustrating thereof in FIG. 3. This motor driving circuit 37 consists of: FET gate driving circuit 371 for driving each of field effect transistors (FETs) FET1 to FET4; an H bridge circuit composed of the field effect transistors FET1 to FET4; and a voltage boosting (or booster) power supply 372 for driving high sides of the field effect transistors FET1 and FET2. Field effect transistors FET1 and FET2 are turned ON or OFF in response to PWM signal having a duty ratio D1. Further, in a region in which the duty ratio D1 is small, the field effect transistors FET3 and FET4 are driven in response to PWM signal having a duty ratio D2 defined by a predetermined linear function (D2=a·D1+b, where a and b are constants). In contrast, in a region in which the duty ratio D1 is large, the field effect transistors FET3 and FET4 are turned ON or OFF in accordance with the direction of rotation of the motor, which is determined according to the sign of PWM signal. For instance, when the field effect transistor FET3 is in a conductive state, electric current flows through the field effect transistor FET1, the motor 20, the transistor FET3 and a resistor R1. Thus, electric current flows through the motor 20 in a positive direction. Further, when the field effect transistor FET4 is in a conductive state, electric current flows through the field effect transistor FET2, the motor 20, the transistor FET4 and a resistor R2. Thus, electric current flows through the motor 20 in a negative direction. Therefore, a signal representing the current control value E is outputted from the adder 30B as PWM output signal. Moreover, the motor current detecting circuit 38 detects the magnitude of a positive direction current on the basis of a drop in voltage developed across the resistor R1. Furthermore, the motor current detecting circuit 38 detects the magnitude of a negative direction current on the basis of a drop in voltage developed across the resistor R2. Motor current value i detected by the motor current detecting circuit 38 is inputted and feedbacked to the subtracter 30A. One of important specifications for the steering performance obtained under the control of the aforementioned control unit concerns the responsiveness of a (power) steering assist unit. Namely, in the case of assuming the emergency steering operation, it is very important how quick a driver or operator can achieve the steering without any sense of incongruity. In the case of the power steering system, the performance of the motor is a dominant factor for the responsiveness. The power supply voltage for the motor is usually limited to a range of voltages (14.5 to 12.0 Volt) supplied from an alternator or a battery. In addition, a restriction is imposed on the size of the motor in conformity with mechanical specifications. Consequently, from the viewpoint of the design of the motor, there is caused a limit to the responsiveness which can be realized by the power steering system.

On the other hand, if the responsiveness becomes a problem, an assist (current) becomes necessary. In the case that the power steering system employs an ordinary power supply which uses both of the alternator and the battery, in accordance with the relation between the ability of the alternator and the current to be supplied to a load, when the current increases, the power supply voltage shifts from a voltage generated by the alternator to a voltage generated by the battery and thus lowers. Consequently, the responsiveness of the motor shifts from a line or segment A to another line B as illustrated in FIG. 4. Therefore, the conventional power steering system has encountered the problem that the necessary responsiveness cannot be obtained.

Further, when performing a quick steering operation so as to avoid danger, steering torque is increased. Thus, it is necessary to generate the assist torque. When driving the motor in such a manner as to surmount the limitations to the ability of the motor, a rapid change in motor current value occurs and consequently, a pulse-like change in the steering torque is caused, as illustrated in FIGS. 5A to 5C. Namely, in the case that a quick steering operation is performed at a time point t1, a motor angular speed or velocity increases as shown in FIG. 5A. In contrast, a motor current i decreases abruptly owing to a counter (or back) electromotive force, as illustrated in FIG. 5B. In addition to this, as shown in FIG. 5C, the steering torque T increases rapidly after the time point t1. Further, the natural oscillation of the system is excited. Thus, a phenomenon indicated by reference character A causes a driver to feel a sense of incongruity.

SUMMARY OF THE INVENTION

The present invention is accomplished under the aforementioned circumstances. Accordingly, an object of the present invention is to provide a controller for an electric power steering system, which enhances the responsiveness of the system by predicting an occurrence of a drop in power supply voltage and by performing an idling-up operation, even at the time of performing an emergency steerage of a steering handle in the case of avoiding danger.

To achieve the foregoing object, in accordance with an aspect of the present invention, there is provided a controller for an electric power steering system adapted to control a motor for giving a steering assist force to a steering mechanism according to a current control value calculated from a steering assist command value, which is computed according to steering torque generated in a steering shaft, and from a motor current value. Further, the above controller is provided with predicting means for predicting an occurrence of a drop in power supply voltage to be applied to the aforesaid motor. Moreover, an idling-up operation is performed when the aforementioned drop in power supply voltage is predicted.

Furthermore, in the case of an embodiment of this controller, the aforesaid predicting means receives a rotating (or rotational) speed or an angular speed of the aforesaid motor and predicts the aforesaid drop in power supply voltage from a current value and a past value of the received speed.

BRIEF DESCRIPTION OF THE DRAWINGS

Other features, objects and advantages of the present invention will become apparent from the following description of a preferred embodiment with reference to the drawings in which like reference characters designate like or corresponding parts throughout several views, and in which.

DETAILED DESCRIPTION OF THE PREFERRED EMBODIMENTS

Although it is desirable for solving the aforementioned problems to perform the idling-up of an engine when a power supply voltage drops, and to maintain an output voltage of an alternator at 14.5 volts by enhancing the current supply ability thereof. However, in the case of the conventional system, there is a time lag between the detection of a drop in the power supply voltage and the recovery of a desired power supply voltage, which is attained by performing the idling-up operation. As a result, the recovery of the desired power supply voltage is too late for the improvement of the responsiveness at an emergency danger avoidance operation (namely, at an emergency steering operation). In contrast, in the case of the controller of the present invention, an occurrence of a shortage of the current supply ability of an alternator is predicted from the current value and the past value of a detected motor current or of a detected angular speed of the motor, and an idling-up signal is preliminarily generated. Thus, the time lag until the recovery of the power supply voltage is compensated, and the necessary responsiveness to the steering operation is maintained.

Figure 7:
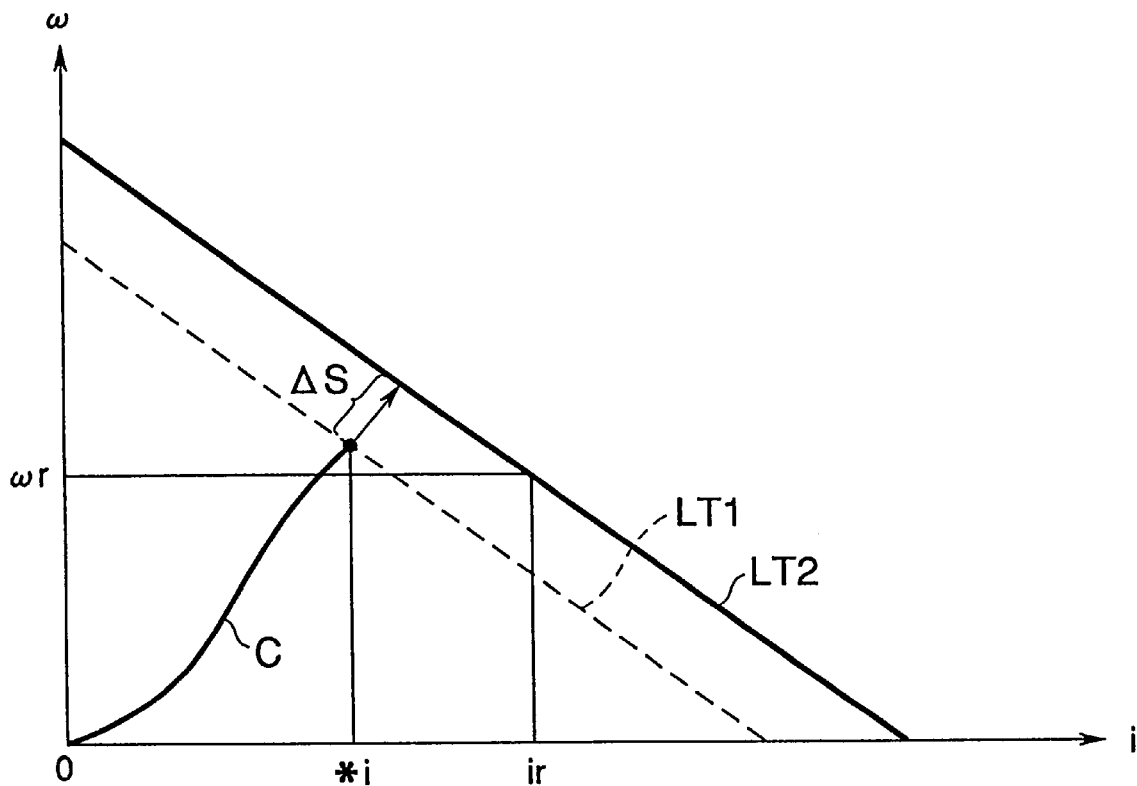
FIG. 7 is a graph illustrating the relation between a motor current and a motor angular speed according to the present invention.

Because it is impossible to control the motor beyond the limit of the performance thereof, the controller of the present invention controls the motor by estimating or predicting the limit of the performance thereof and enhancing the current supply ability of the alternator. FIG. 7 shows the motor current value i vs the motor angular speed ($\omega$) characteristic for illustrating such a control operation. In this graph, reference characters ir represents a rated current; and $\omega$r a rated angular speed. Moreover, a curve C indicates a change in handle manipulation. Characteristic limitation (of the performance) of the motor is LT2 ($\omega=a2\cdot i+b2$). In the case of the controller of the present invention, it is predicted whether or not the motor reaches a judgment (criterion) characteristic LT1 ($\omega=a1\cdot i+b1$) which the motor should reach at a moment that is a time period $\Delta t$ before reaching the characteristic limitation LT2. Further, when reaching the judgment characteristic LT1, an idling-up operation is performed by issuing an idling-up signal. Consequently, the time lag ($\Delta t$) until the recovery of the power supply voltage is compensated, so that the necessary responsiveness to a steering operation can be maintained. In FIG. 7, reference characters *i designates an evaluated or predicted current value; and $\Delta S$ a predicted shift amount in a time period $\Delta t$. Incidentally, the time period $\Delta t$ is usually 0.5 second.

Hereinafter, the preferred embodiment of the present invention will be described in detail by referring to the accompanying drawings.

Figure 1:
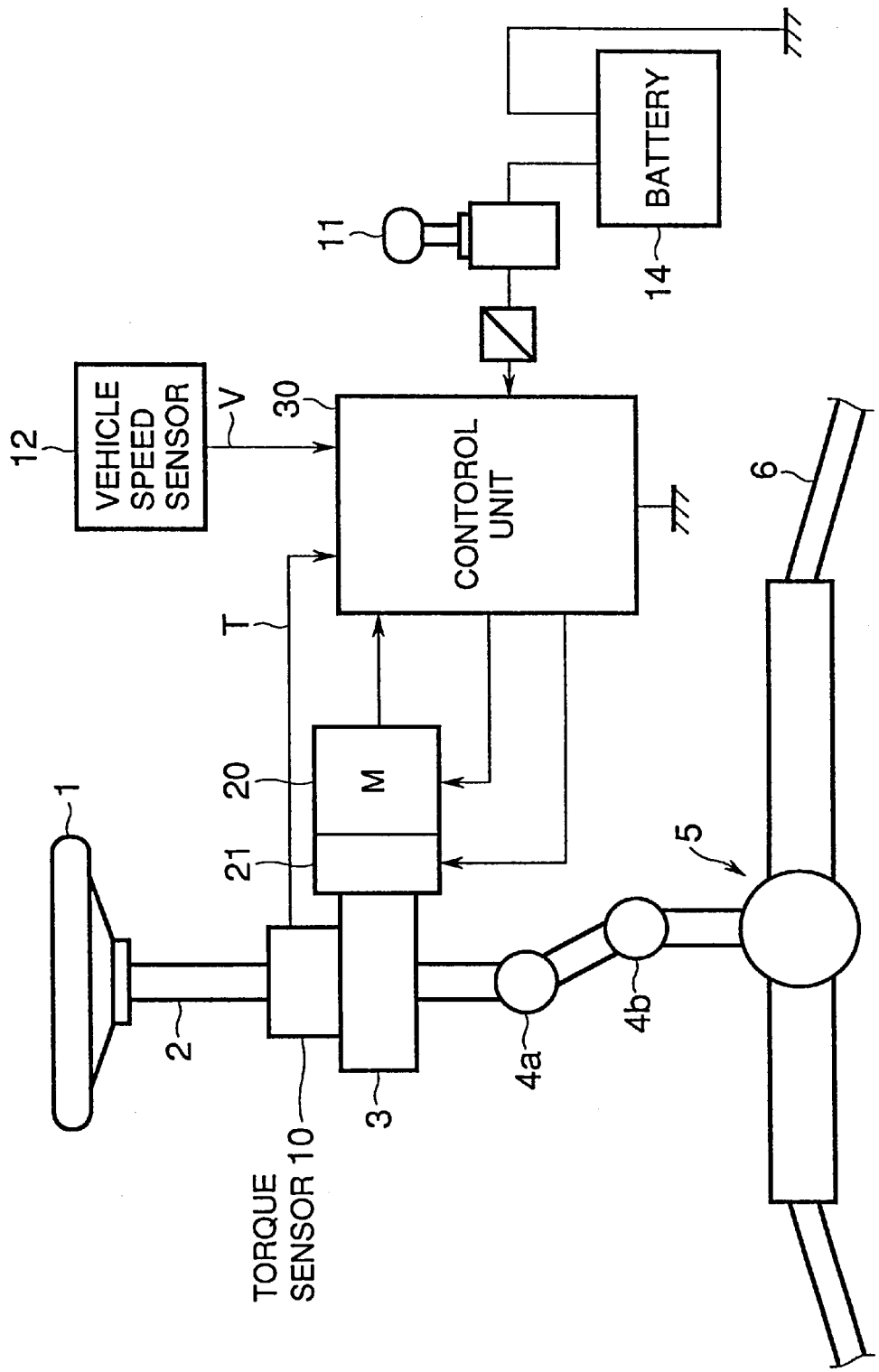
FIG. 1 is a block diagram illustrating the configuration of an example of a (conventional) electric power steering system.
Figure 2:
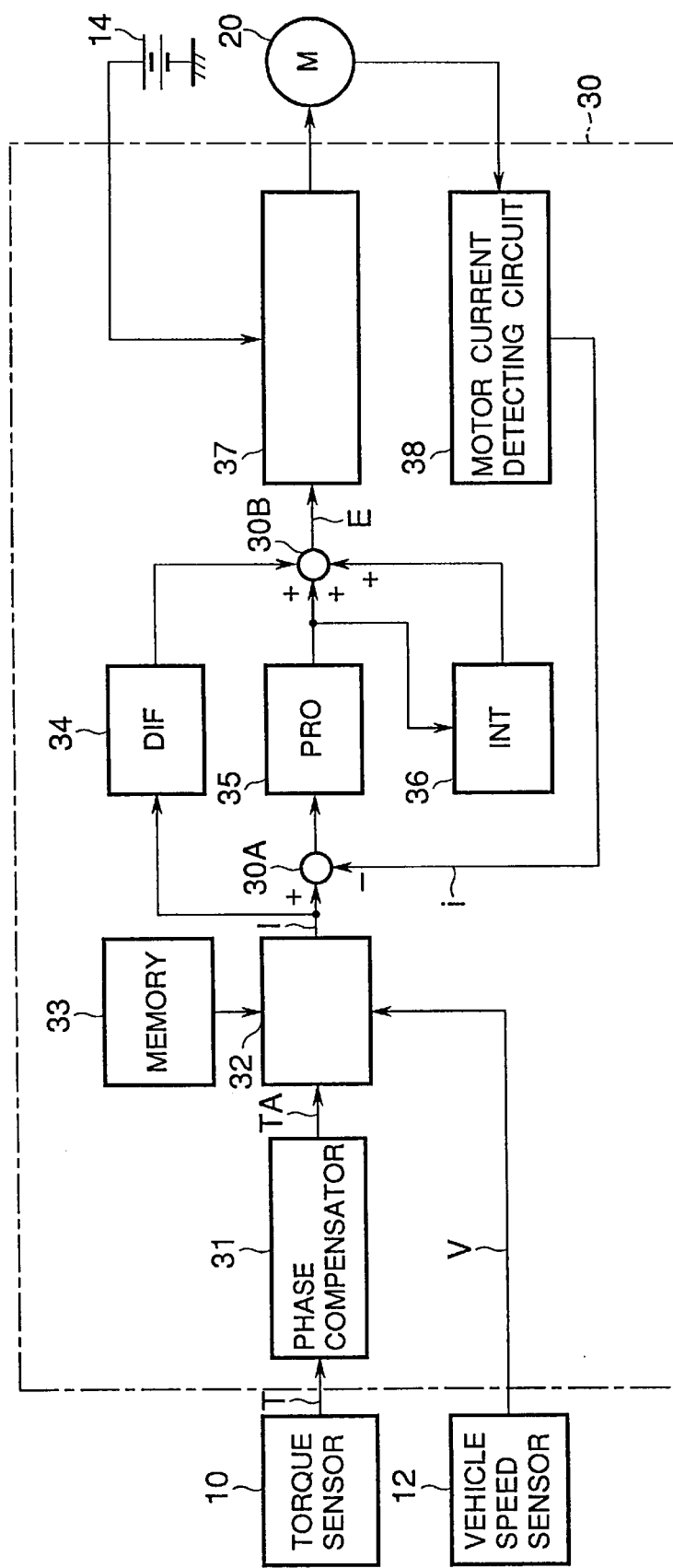
FIG. 2 is a block diagram illustrating the common internal configuration of a control unit (of the conventional electric power steering system)
Figure 3:
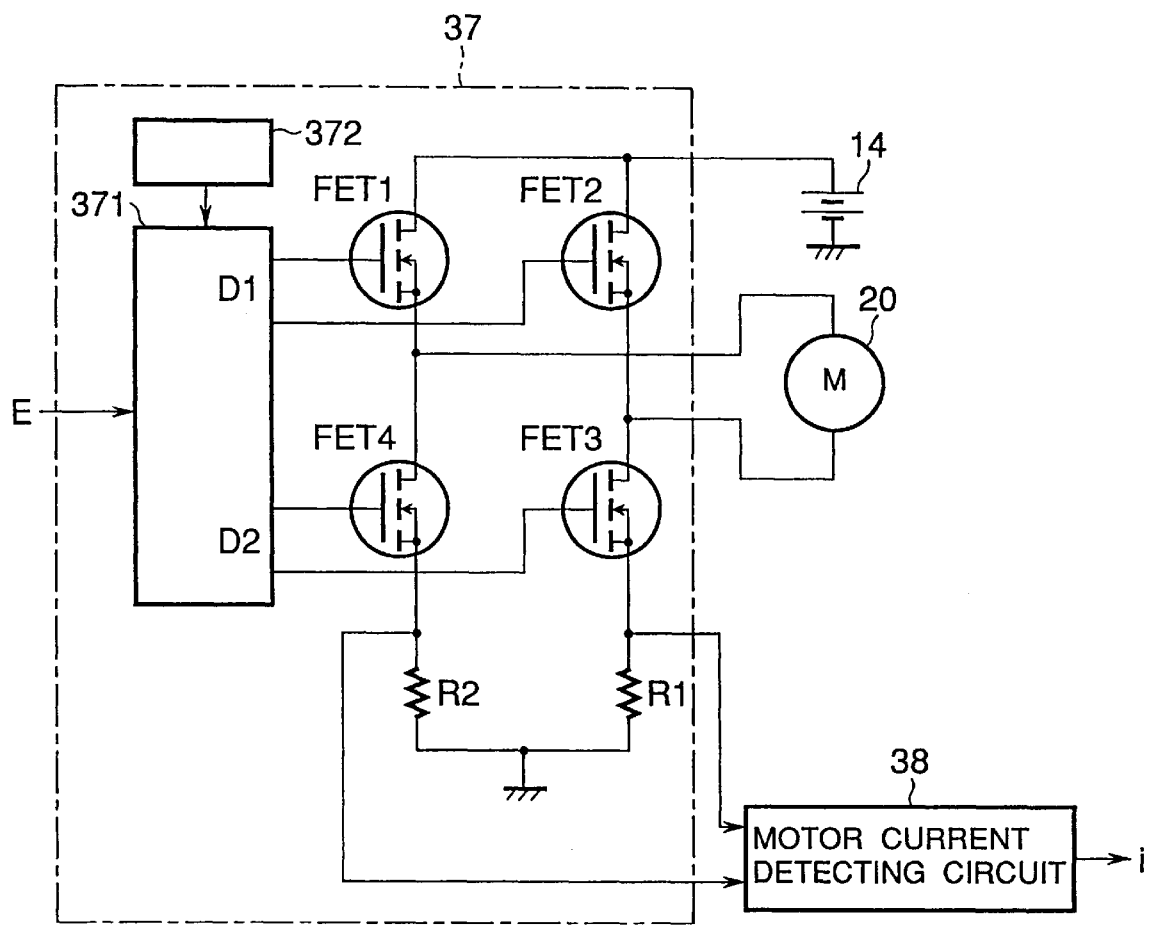
FIG. 3 is a schematic diagram illustrating an example of a motor driving circuit (of the conventional electric power steering system)
Figure 4:
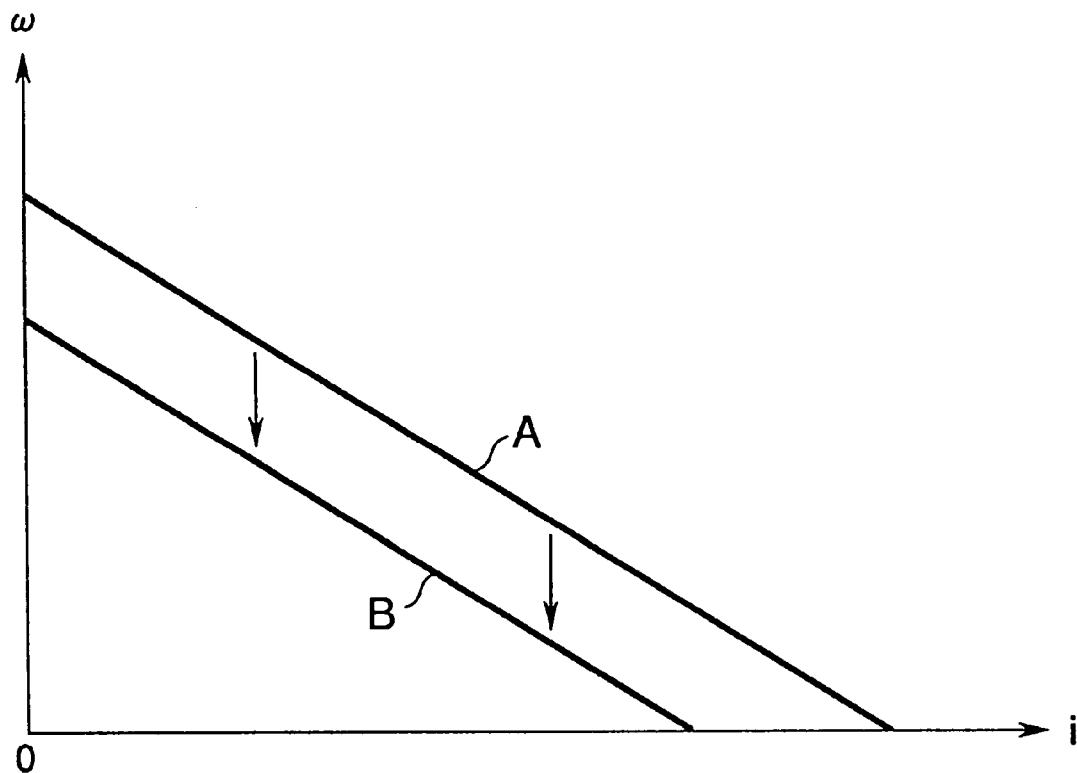
FIG. 4 is a graph for illustrating the lowering of the limitation to the performance of the motor due to a drop in power supply voltage.
Figure 5:
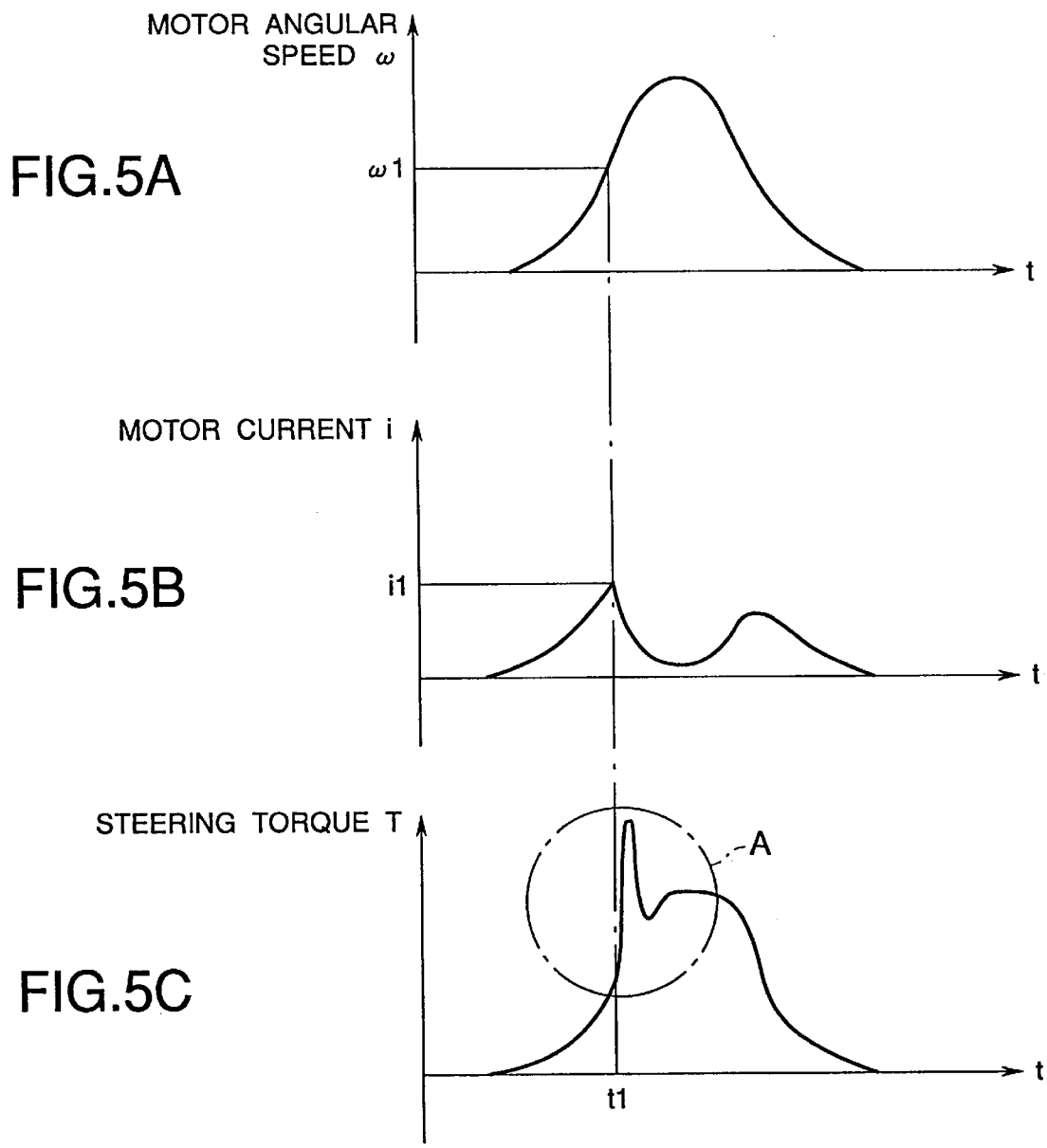
FIGS. 5A to 5C are diagrams for illustrating an example of an operation of the conventional system when an emergency steering operation is performed.
Figure 6:
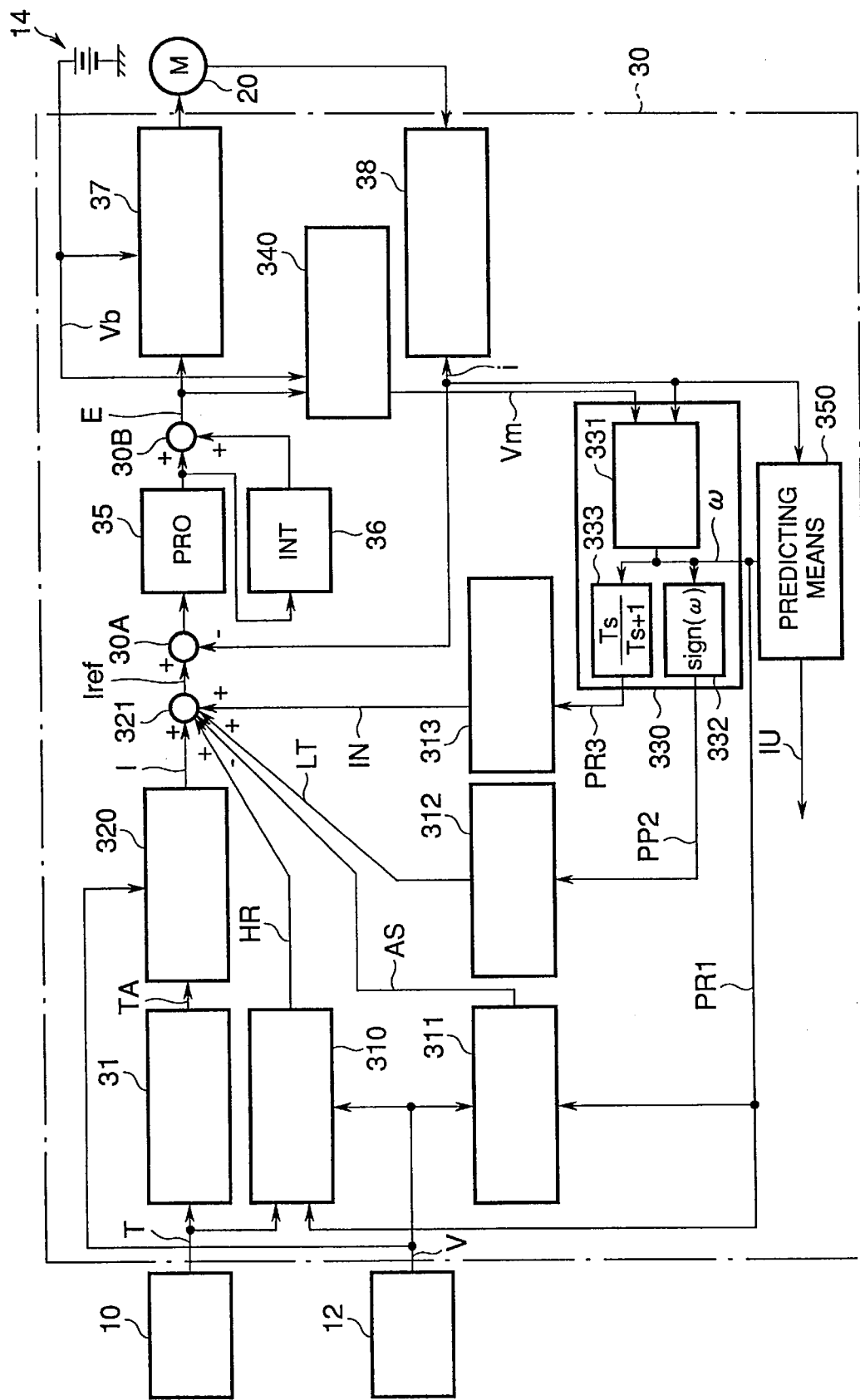
FIG. 6 is a block diagram illustrating an example of a control unit in an electric power steering system of the present invention.

Control unit of the present invention is configured in such a manner as to detect the angular speed $\omega$ and the motor current value i of the motor 20 and to predict from the detected angular speed $\omega$ and the detected motor current value i whether or not the motor reaches the judgement characteristic LT1, and to perform an idling-up operation when reaching the characteristic LT1. Incidentally, FIG. 6 is drawn correspondingly to FIG. 2. Signal representing steering torque T, which is sent from the torque sensor 10, is inputted to the phase compensator 31 and a handle return control device 310. Further, a signal representing a vehicle speed V, which is issued from the vehicle speed sensor 12, is inputted to the handle return control device 310 and a convergence control device 311 and is also inputted to a steering assist command value computing unit 320. Steering assist command value I outputted from the steering assist command value computing unit 320 is then inputted to an adder/subtracter 321 as an assist command. Furthermore, a steering assist command value Iref outputted from the adder/subtracter 321 is inputted to a subtracter 30A. Current control value E outputted from the adder 30B and a voltage Vb supplied from the battery 14 are inputted to an inter-terminal voltage estimating device 340. Inter-terminal voltage estimating value Vm is inputted to an angular speed estimating device 331 provided in an estimating unit 330. Moreover, a motor current detecting value i sent from a motor current detecting circuit 38 is inputted to the subtracter 30A and is also inputted to the angular speed estimating device 331. An estimated value PR1 obtained by the estimating unit 330 is inputted to the handle return control device 310 and the convergence control device 311. An estimated value PR2 obtained by the unit 330 is inputted to a loss torque compensator 312. An estimated value PR3 is inputted to an inertia compensating device 313. Angular speed $\omega$ estimated by the angular speed estimating device 331 provided in the estimating unit 330 is directly outputted as the estimated value PR1. Thus, the estimated value PR1 represents the motor angular speed $\omega$. Further, the angular speed $\omega$ is inputted to a sign detector 332 whereupon the sign of the angular speed is determined or detected. Thus, the estimated value PR2 indicates the direction of rotation of the motor. Further, the estimated value PR3, which is obtained by differentiating a motor angular speed $\omega$ in an approximate differentiator 333, designates a motor angular acceleration. A handle return signal HR outputted from the handle return control device 310 is inputted and added to the adder/subtracter 321. A convergence signal AS outputted from the convergence control device 311 is inputted to and subtracted from the adder/subtracter 321. A loss torque compensating signal LT outputted from the loss torque compensator 312 and an inertia compensating signal IN outputted from the inertia compensator 313 are inputted and added to the adder/subtracter 321.

The control unit 30 of the present invention is provided with predicting means 350 to which the motor current value i and the angular speed $\omega$ are inputted from the motor current detecting circuit 38 and the estimating unit 330, respectively. The predicting means 350 is operative to predict a drop in the power supply voltage from the inputted motor current value i and the inputted motor angular speed $\omega$. Furthermore, the predicting means 350 is operative to enhance the current supply ability of the alternator by outputting an idling-up signal IU for an idling-up operation when a drop in the power supply voltage is detected on the basis of the predicted or estimated value. Purpose of employing the control unit of the present invention is to use the motor 20 within the limitation of the characteristic of the motor. Moreover, the limitation of the characteristic is determined according to the relation between the current and the angular speed. Therefore, it is detected from the current and the angular speed that the current characteristic of the motor 20 is close to the limitation thereof. Further, when it is detected that the current characteristic of the motor 20 is close to the limitation thereof, the current supply ability of the alternator is enhanced by performing an idling-up operation. Thus, the responsiveness of the motor 20 is enhanced. Hence, the predicting means 350 is adapted in such a manner as to detect that the current characteristic of the motor 20 is close to the limitation thereof, by using the motor current value i and the angular speed $\omega$ without using the torque signal T.

Figure 8:
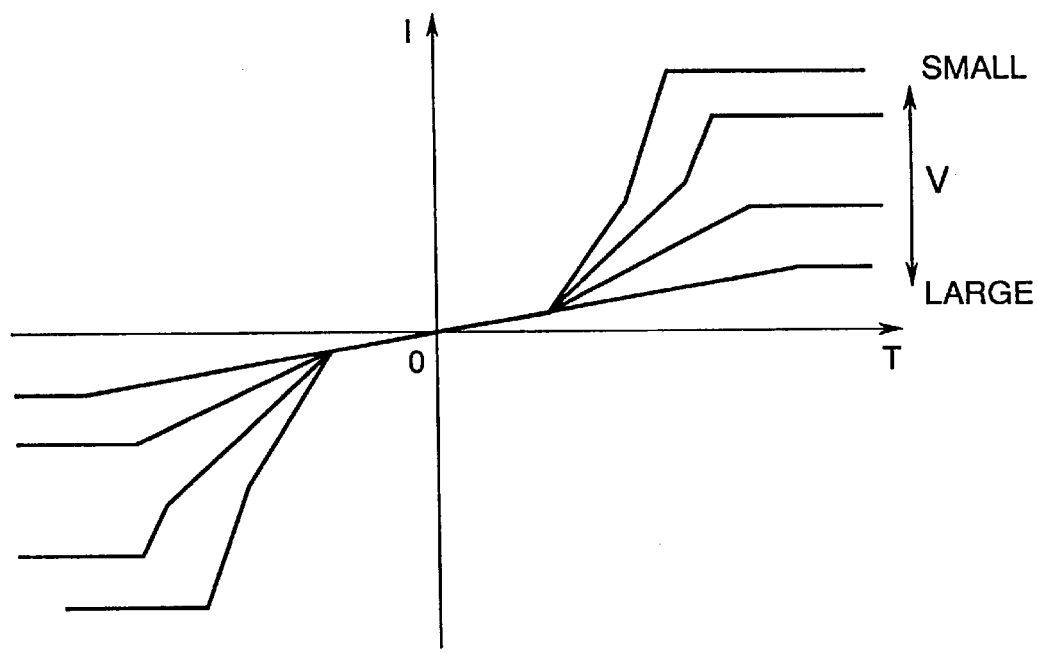
FIG. 8 is a characteristic graph illustrating an example of the relation between steering torque and a steering assist command value by using a vehicle speed as a parameter.

The steering assist command value computing unit 320 is operative to calculate the steering assist command value I as an assist command from the steering torque T and the vehicle speed V on the basis of the assist characteristic preliminarily defined by a polynomial as illustrated in FIG. 8, and to output the calculated steering assist command value I. The handle return control device 310 is operative to output the handle return signal HR in a handle return state and perform an assist operation in the direction of return thereof so as to improve the handle return characteristic exhibited at intermediate and low speeds. The convergence control device 311 is adapted to apply a brake against a jolting motion of the handle so as to improve the convergence of a yawing motion of a vehicle. Therefore, the vehicle speed V is inputted to the handle return control device 310 and the convergence control device 311. The loss torque compensator 312 is operative to output a loss torque compensating signal LT and to perform an assist operation corresponding to the loss torque in a direction in which the loss torque is generated, namely, in the direction of rotation of the motor 20 so as to cancel the influence of loss torque. Moreover, the inertia compensator 313 is operative to perform an assisting operation corresponding to a force produced owing to the inertia of the motor 20 and is also operative to output an inertia compensating signal IN to thereby prevent the feeling of inertia or the responsiveness of the control from being deteriorated. Therefore, the estimated value PR2 inputted to the loss torque compensator 312 indicates the direction of rotation of the motor. Further, the estimated value PR3 inputted to the inertia compensator 313 indicates the motor angular acceleration.

Meanwhile, as described in Japanese Patent Application Laid-open No. 8-67262, the motor angular speed ω can be obtained from the estimated value of the motor counter electromotive force. Namely, the estimated value $K_T$ of the motor counter electromotive force is obtained from the inter-terminal voltage Vm of the motor and the motor current value i by the following equation (1):

$$K_T \cdot \omega = Vm - R \cdot i \quad (1)$$

where R designates the inter-terminal resistance; and $K_T$ a counter electromotive force constant.

Incidentally, it is assumed that the frequency component of the motor angular speed ω is sufficiently low as compared with the electric response characteristic of the motor.

Figure 9:
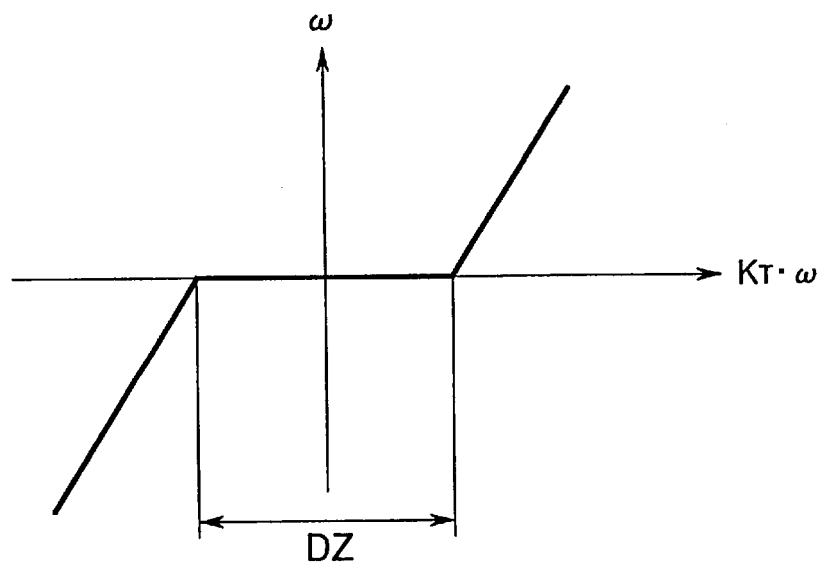
FIG. 9 is a graph illustrating the relation between the counter electromotive force and the angular speed of a motor.

Although the angular speed ω of the motor 20 can be obtained sit by the aforementioned equation (1), an estimation error e of the estimated value ω of the motor angular speed is caused in a direction, in which an offset is present, in the case that there is a difference between the actual electric characteristic of the motor and the electric characteristic defined by using a mathematical model. Incidentally, although motor inductance L affects the angular speed in the case of an actual motor, the characteristic in the case of neglecting the inductance L is employed as the mathematical model. Thus, the inter-terminal voltage is expressed as follows: Vm=R·i. If there is such an offset error e, for example, even when the steering handle is held in a position, it is erroneously determined that the motor 20 rotates, in the case where a correction signal is produced by using the estimated value. Consequently, in such a case, an erroneous correction signal is outputted. Actual electrical characteristic of the motor 20 is affected by the variation in quantity of the motor, which occurs when produced, and by the variation in temperature. Consequently, the aforementioned offset error e occurs inevitably. It is considered for the purpose of solving such a problem that a fixed dead zone DZ is established correspondingly to the estimated value $K_T$, of the motor counter electromotive force as illustrated in FIG. 9. Conversely, in this case, there is caused another problem that the motor counter electromotive force cannot be estimated in a region in which the motor angular speed ω is small.

As stated above, a primary factor in generating an estimation error e of the motor angular speed ω is the difference between the electrical characteristic $K_T \cdot \omega$ of an actual motor and the electrical characteristic $K_T \cdot \omega'$ defined by using the mathematical model. Namely, the following equation (2) holds for the inter-terminal resistance R of the motor:

$$R = Rm + \Delta Rt + \Delta Rp \quad (2)$$

where Rm denotes the resistance in the case of using the model; ΔRt variation in the resistance due to a change in temperature; and ΔRp a change in the resistance owing to variation in the quality of the motor when manufactured.

Thus, the inter-terminal voltage Vm of the actual motor is obtained as follows by substituting the equation (3) for R in the equation (1):

$$Vm = (Rm + \Delta Rt + \Delta Rp) \cdot i + K_T \cdot \omega \quad (3)$$

In contrast, in the case of using the mathematical model obtained by disregarding the variation in quality of the motor when manufactured, and the variation in temperature, the inter-terminal voltage Vm is obtained by the following equation (4):

$$Vm = Rm \cdot i + K_T \cdot \omega' \quad (4)$$

Therefore, the estimation error e of the counter electromotive force is given by the following equation (5) obtained from the aforementioned equations (3) and (4):

$$\begin{aligned} e &= K_T \cdot \omega' - K_T \cdot \omega \\ &= Vm - Rm \cdot i - \{Vm - (Rm + \Delta Rt + \Delta Rp) \cdot i\} \\ &= (\Delta Rt + \Delta Rp) \cdot i \end{aligned} \quad (5)$$

Figure 10:
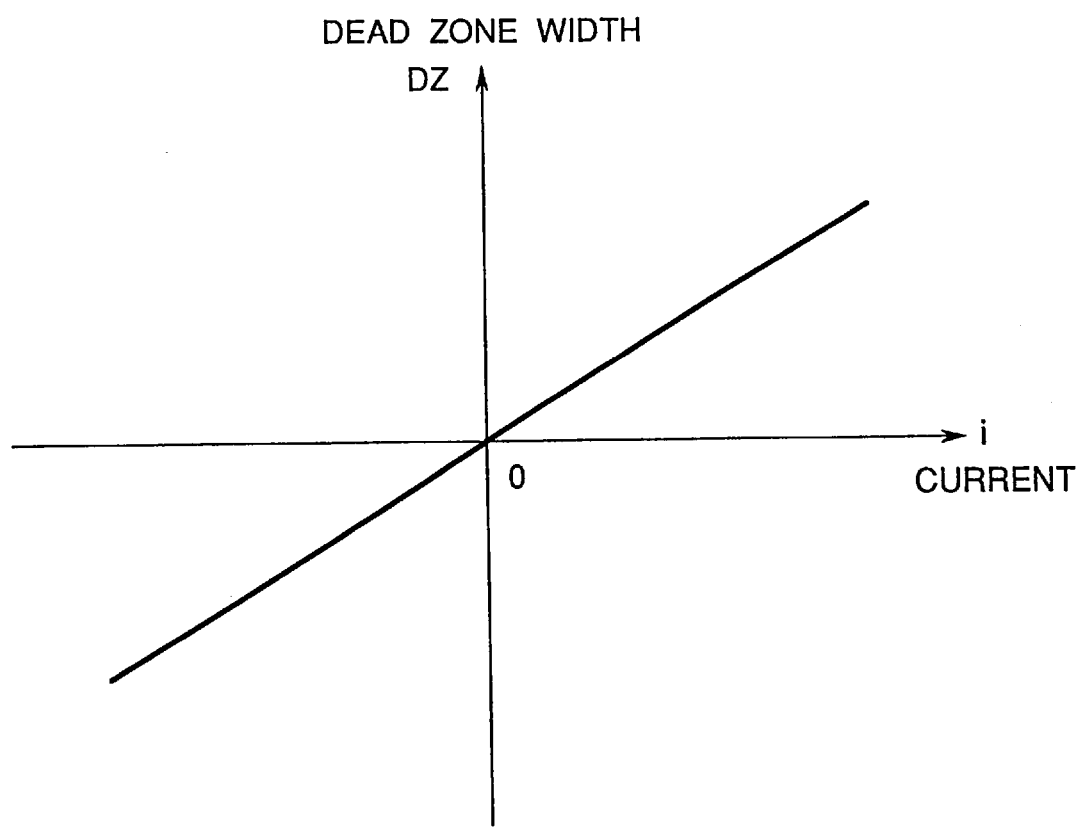
FIG. 10 is a graph illustrating an example of the relation between a motor current value and a dead zone (or band) width.

Consequently, the offset error e, which is proportional to the current i, is generated. Thus, as a result of establishing a dead zone, whose width is proportional to a current i, according to, for instance, the relation illustrated in FIG. 10, the offset value becomes small when the current i is small. Moreover, the dead zone width "DZ=K·i" similarly becomes small. Hence, even in the region in which the motor angular speed ω is small, the motor counter electromotive force can be estimated or predicted.

Meanwhile, in the case that the angular speed ω is estimated from the current control value E and the motor current value i, which are PWM outputs, it is supposed that the dead zone width DZ is proportional to the motor current value i. Namely, let K denote a constant. Then, the following equation "DZ=K·i" holds. In this case, a value, which is not less than the maximum value of the variation in the inter-terminal voltage of the motor in the equation (5), is set as a proportional coefficient or factor K. Therefore, the estimated value of the angular speed does not have the offset error e at all. Further, even in the region where the actual motor angular speed is low, the motor angular speed ω can be estimated by the angular speed estimating device 331. Furthermore, in the case that the motor angular speed ω is different in direction from the current i, namely, in the case that the handle is returned to an initial position, no offset error is produced as is understood from the following equation (7). Thus, it is preferable that what is called the dead zone correction is not performed. Namely, $$K_T \cdot \omega' = K_T \cdot \omega - (\Delta Rt + \Delta Rp) \cdot |i| \quad (6)$$

Further, if $|i| \approx 0$, $$K_T \cdot \omega' = K_T \cdot \omega \quad (7)$$

Figure 11:
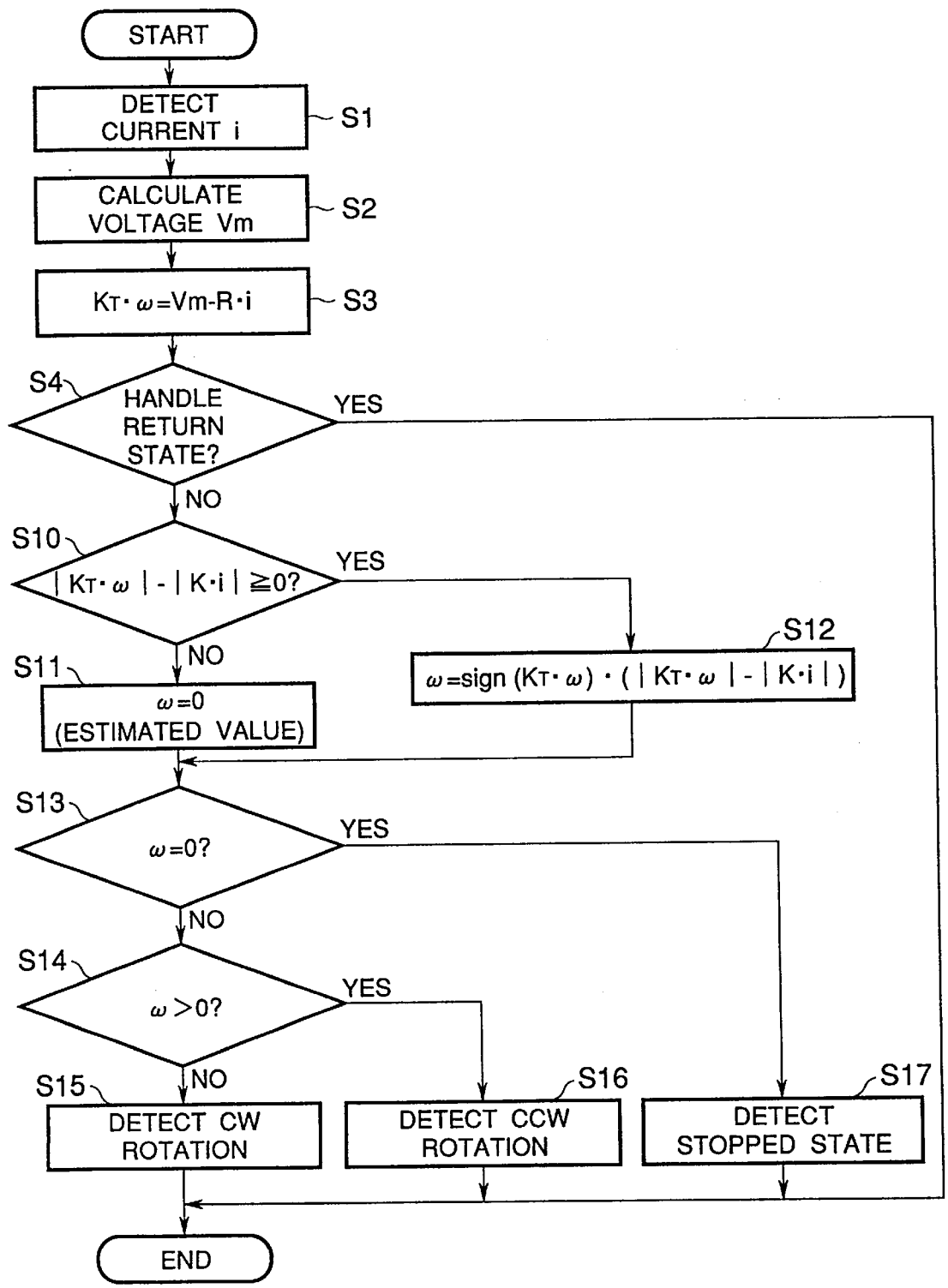
FIG. 11 is a flowchart illustrating an example of an operation of detecting the (rotating) speed of the motor in each state thereof.

FIG. 11 illustrates an example of an operation of detecting the angular speed ω (namely, the direction of rotation and the stopped state) of the motor 20 by means of the estimating unit 330. First, the motor current value i is detected by the motor current detecting circuit 38 (Step S1). Subsequently, the inter-terminal voltage Vm is calculated by the inter-terminal voltage estimating device 340 according to the equation "Vm=Vb·E" on the basis of the voltage Vb supplied from the battery 14 and the current control value E (Step S2). Then, the angular speed ω is obtained by the angular speed estimating device 331 and the calculation of the equation (1) is performed (Step S3). Next, it is determined on the basis of the angular speed ω and the motor current value i, whether or not the steering handle is in the handle return state (Step S4). If so, this operation is finished. In contrast, if not, the computation of the following inequality (8):

$$|K_T \cdot \omega| - |K \cdot i| \geq 0 \tag{8}$$

is performed (Step S) so as to determine whether or not the absolute value of the motor counter electromotive force $K_T \cdot \omega$ is less than the dead zone width "DZ=K·i". Further, if the motor counter electromotive force is not less than the dead zone width, the computation of the following equation (9) is performed (Step S12):

$$\omega = \text{sign}(K_T \cdot \omega) \cdot (|K_T \cdot \omega| - |K \cdot i|) \tag{9}$$

In contrast, if not, the estimated value of the angular speed is set (Step S11) as follows: ω=0.

Incidentally, in the case that the counter electromotive force $K_T$ is positive in the aforementioned equation (9), sign($K_T \cdot \omega$) is "+1". Conversely, in the case that the counter electromotive force $K_T \cdot \omega$ is negative, sign($K_T \cdot \omega$) is "−1". Thereafter, it is determined whether or not the motor angular speed ω is "0" (Step S13). If so, the stopped state of the motor is detected (Step S17). If not, it is determined (Step S14) whether or not the motor angular speed ω is positive. For instance, if positive, it is determined that the motor rotates clockwise (Step S16). Conversely, if negative, it is determined that the motor rotates counterclockwise (Step S15).

In the case of the control unit of the present invention, the detection of the angular speed of the motor 20 is performed by using the estimated value of the angular speed of the motor, which is obtained in the aforementioned Step S3. As above described, the estimation error e of the offset type is generated from the estimated value ω of the angular speed of the motor. Thus, in the case of generating a correction signal by using the estimated value, there is caused a defect in that, even when the steering handle is held in a position, it is erroneously determined that the motor 20 rotates. In contrast, the angular speed of the motor can be detected accurately after establishing the dead zone, whose width "DZ=K·i" is proportional to the motor current value i, and further performing offset correction.

The convergence control device 311 is used to output a signal representing Ks·ω obtained by multiplying the motor angular speed ω, which is estimated by the estimating unit 330, by a predetermined gain Ks, which is preliminarily set, as a convergent signal AS, and to control the convergence of the vehicle.

Figure 12:
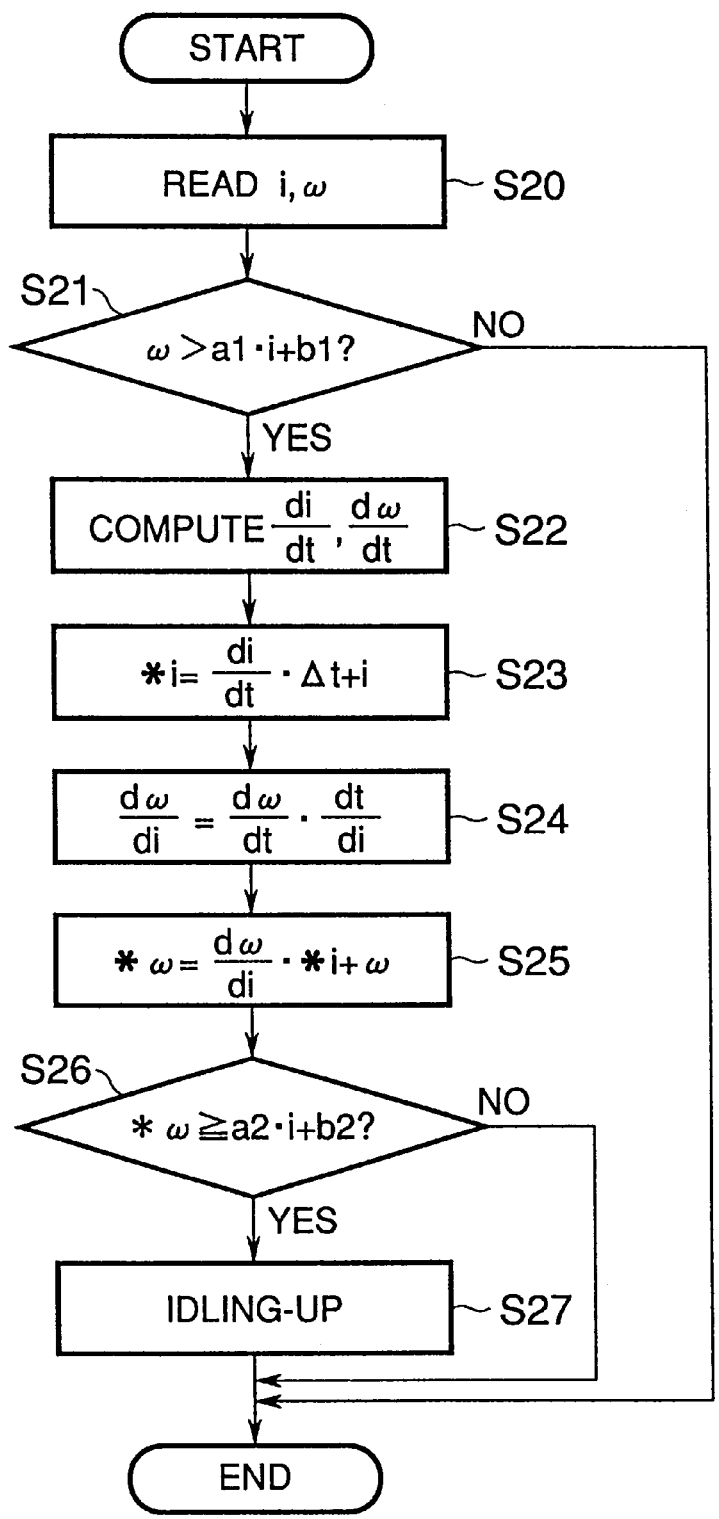
FIG. 12 is a flowchart illustrating an example of an operation of an embodiment of the present invention.

Meanwhile, an operation of the predicting means 350 of the present invention will be described hereunder by referring to a flowchart of FIG. 12. First, the predicting means 350 receives and reads the angular speed ω sent from the estimating unit 330 and the motor current value i sent from the motor current detecting circuit 38 (Step S20). Then, the predicting means 350 determines whether or not the angular speed ω is larger than the judgement characteristic "LT1=a1·+b1" (Step S21). If the angular speed exceeds the judgment characteristic LT1, "di/dt" and "dω/dt" are calculated (Step S22). Next, a predicted current value *i as shown in FIG. 7 is obtained by computing "(di/dt)·Δt+i" (Step S23). Moreover, "dω/di" is obtained by the following equation (10) (Step S24):

$$d\omega/di = (d\omega/dt) \cdot (dt/di) \tag{10}$$

When the predicted current value *i is obtained by the aforementioned equation (10), the predicted angular speed *ω to be obtained after the elapse of the time period Δt can be found according to the following equation (11) (Step S25):

$$*\omega = (d\omega/di) \cdot *i + \omega \tag{11}$$

When the predicted angular speed *ω is obtained, it is next determined whether or not this predicted angular speed *ω is more than the limitation of the characteristic "LT2=a2·i+b2" (Step S26). If the predicted angular speed *ω is not less than the limitation of the characteristic LT2, an idling-up signal IU is outputted (Step S27) to thereby enhance the current supply ability of the alternator.

As above described, even in the case that the voltage applied to the motor drops and the limitation to the performance of the motor is lowered, the controller for the electric power steering apparatus of the present invention is adapted to predict whether or not the limitation to the performance of the motor is exceeded, and to perform an idling-up operation according to a result of the prediction. Thus, even when performing an emergency steering operation, the responsiveness of the motor can be enhanced.

Although a preferred embodiment of the present invention has been described above, it should be understood that the present invention is not limited thereto and that other modifications will be apparent to those skilled in the art without departing from the spirit of the invention.

The scope of the present invention, therefore, is to be determined solely by the appended claims.

What is claimed is:

1. A controller for an electric power steering system adapted to control a motor for giving a steering assist force to a steering mechanism according to a current control value calculated from a steering assist command value, which is computed according to steering torque generated in a steering shaft, and from a motor current value, said controller comprising:

predicting means for predicting an occurrence of a drop in power supply voltage to be applied to said motor, wherein an idling-up operation is performed when the drop in power supply voltage is predicted.

2. A controller for an electric power steering system according to claim 1, wherein said predicting means receives a rotating speed or an angular speed of said motor and predicts the drop in power supply voltage from a current value and a past value of the received speed.

3. A controller for an electric power steering system according to claim 2, wherein said predicting means further receives the motor current value.

4. A controller for an electric power steering system according to claim 1, wherein said predict means defines a characteristic limitation LT2 of said motor, predicts whether or not said motor reaches a judgment characteristic LT1 which said motor should reach at a moment that is a time period Δt before reaching said characteristic limitation LT2 and then performs said idling-up operation.

5. A controller for an electric power steering system according to claim 4, wherein said characteristic limitation LT2 is expressed by "$\omega = a2 \cdot i + b2$" and said judgment characteristic LT1 is expressed by "$\omega = a1 \cdot i + b1$", where $\omega$ is a motor angular speed, i is a motor current and a1, a2, b1, b2 are constants.

6. A controller for an electric power steering system according to claim 5, wherein said time period is 0.5 second.

7. A controller for an electric power steering system according to claim 6, wherein an enhancement of a current supply ability of an alternator based on said idling-up operation.

* * * * *